Nov. 13, 1956  A. M. LOSEY  2,770,149
TRANSMISSION, PARTICULARLY FOR HELICOPTER ROTORS
Filed March 9, 1953  5 Sheets-Sheet 1

INVENTOR
A. MARQUIS LOSEY

Nov. 13, 1956    A. M. LOSEY    2,770,149
TRANSMISSION, PARTICULARLY FOR HELICOPTER ROTORS
Filed March 9, 1953    5 Sheets-Sheet 3

INVENTOR
A. MARQUIS LOSEY

Nov. 13, 1956  A. M. LOSEY  2,770,149
TRANSMISSION, PARTICULARLY FOR HELICOPTER ROTORS
Filed March 9, 1953  5 Sheets-Sheet 5

INVENTOR.
A. MARQUIS LOSEY

United States Patent Office 2,770,149
Patented Nov. 13, 1956

2,770,149

TRANSMISSION, PARTICULARLY FOR HELICOPTER ROTORS

Arthur Marquis Losey, East Islip, N. Y., assignor to Gyrodyne Company of America, Inc., St. James, N. Y., a corporation of New York Application March 9, 1953, Serial No. 341,235

11 Claims. (Cl. 74—665)

The present invention relates to transmissions, particularly to transmissions having coaxial counter-rotating power outlet shafts and more particularly to such transmissions having large speed reduction ratios as from 50:1 to 200:1, or higher, and transmissions of relatively high out-put torque capacities such as one million to five million pound inches or higher. Transmissions in accordance with the invention, are especially suitable for use in helicopters having coaxial rotors turning in opposite directions.

The rotors of a helicopter turn at relatively low speeds, for example, 50 to 300 revolutions per minute. The speed of the power plant on the contrary is relatively high. In order to obtain maximum power with minimum weight, it is sometimes desirable to use an ultra high speed power plant, for example, a turbine which may run at speeds of 10,000 to 30,000 R. P. M. Such a power plant requires a relatively large speed reduction. Moreover, as the speed is reduced, the torque is correspondingly increased so that the final force applied to the output shaft is relatively high. With gear transmissions of configurations heretofore used, this high torque would result in excessively large gear diameters and/or intolerably wide faces to avoid prohibitive tooth stresses in both bending and crushing and/or extreme tooth engagement velocities An object of the present invention is to provide an improved transmission configuration which is capable of effecting large speed reductions and of transmitting high torques. Another object of this invention is to provide a transmission configuration which has a relatively low Weight-Torque ratio. A further object is to provide such a transmission which will have a low Weight-Speed Reduction ratio. A still further object is to provide such a transmission which will have a low Envelope-Torque and/or Speed Reduction ratio. A final object of this invention is to provide a transmission incorporating all the foregoing features while exhibiting a high overall mechanical efficiency and life cycle.

In accordance with the invention, the entire input torque is preferably multi-channeled and the resulting torque is then successively divided as the speed is reduced. The load is thereby uniformly distributed between a plurality of elements so that the stress on any one element is kept within such limits that the life-cycle is relatively high. Moreover, in the use of multiple power-plants the output is first divided and ultimately combined in such a manner that the loading is properly absorbed from the power plants whether one or all are operating. In the event one power unit fails or for any reason its power is lessened or cut out, the energy of the remaining power plant or power plants is absorbed by both outlet shafts.

The objects and advantages of the invention will be further understood from the following description and claims in conjunction with the accompanying drawings which illustrate, by way of example, preferred embodiments of the invention. In the drawings:

Figure 1:
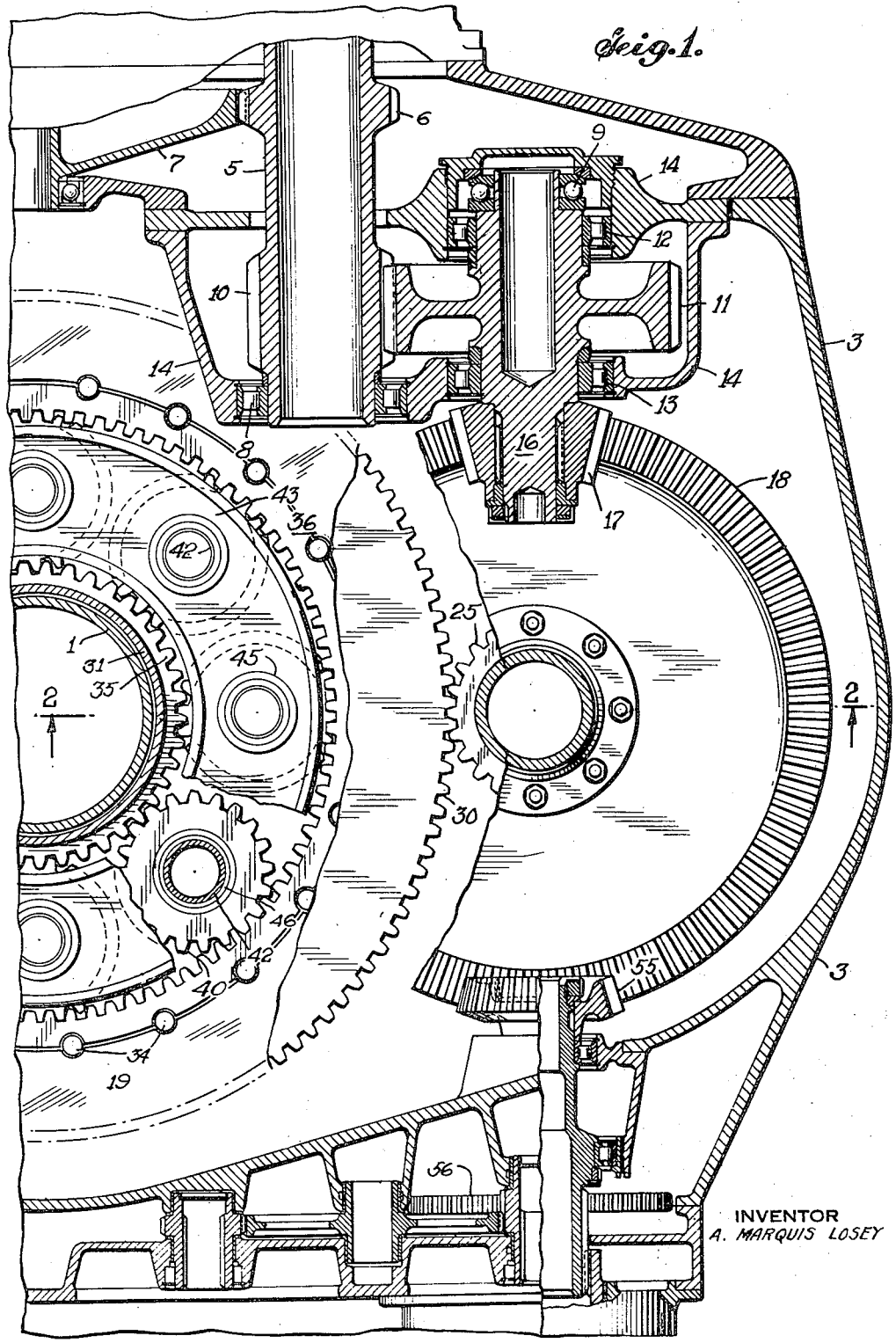
Fig. 1 is a partial horizontal section of a transmission in accordance with the invention, the section being taken approximately on the line 1—1 in Fig. 2.
Figure 2:
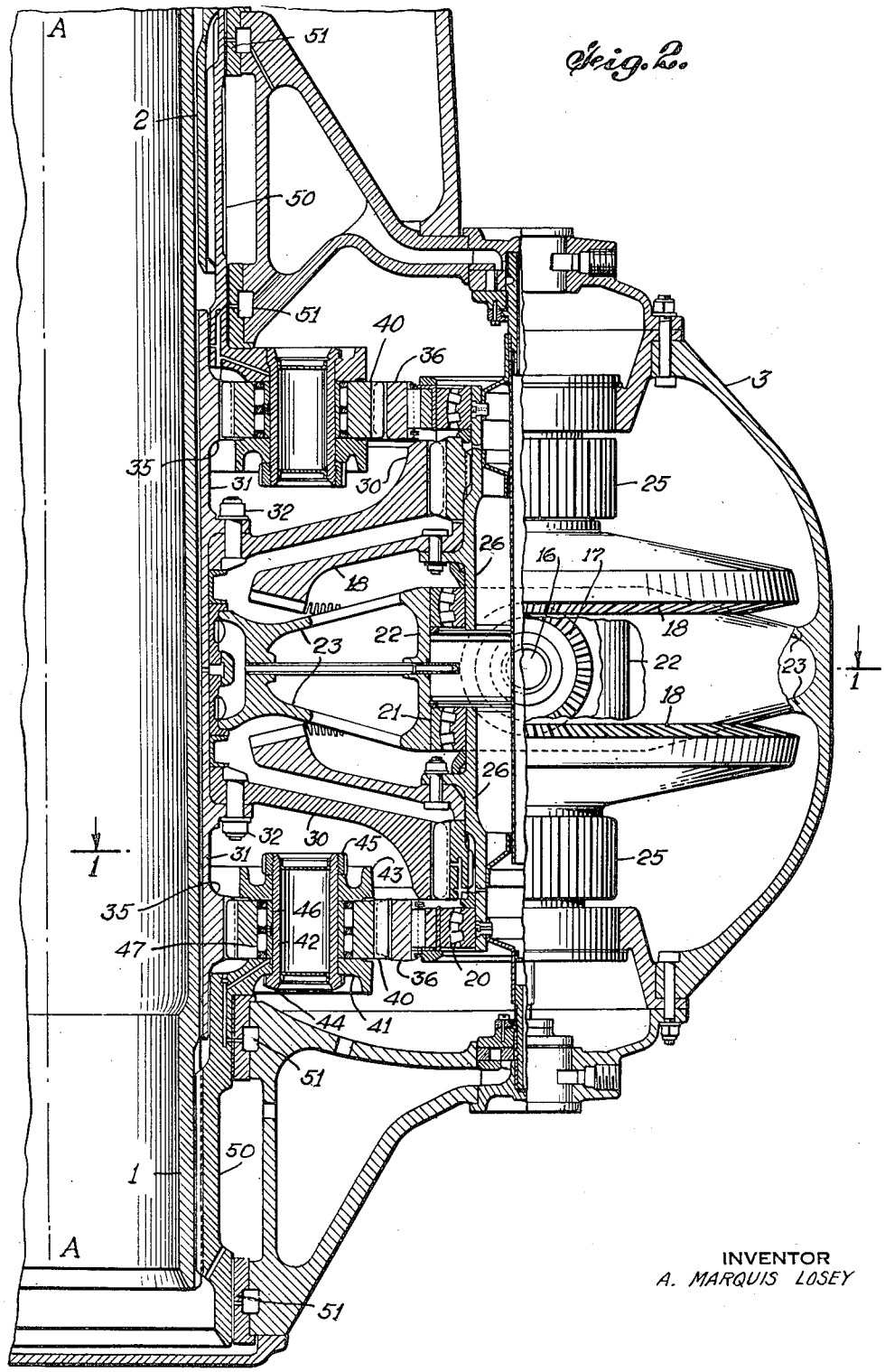
Fig. 2 is a vertical section taken approximately on the line 2—2 in Fig. 1.

In Figs. 1 and 2 of the drawings, there is shown a transmission in accordance with the invention for driving two co-axial rotor shafts 1 and 2. The inner rotor shaft 1 drives the upper rotor of a coaxial helicopter while the outer rotor shaft 2 drives the lower rotor. The axis of the rotor shafts is indicated at A—A. The transmission has a housing 3 which encases the transmission and also provides support for various rotating and non-rotating parts. The term "housing" is herein used in a generic sense to refer to the casing of the transmission as well as to the frame or other supporting structure. To simplify the drawings, Figs. 1 and 2 show only one half of the transmission, the other half of which is substantially identical and is disposed on the diametrically opposite side of the rotor shaft axis A—A. The transmission is thus symmetrical with respect to a vertical plane that passes through the axis A—A and is perpendicular to the plane of the paper in Figs. 1 and 2.

In the embodiment of the invention illustrated in Figs. 1 and 2, the power input comprises two parallel drive shafts 5, one of which is shown in Fig. 1 and the other is correspondingly located in the opposite half of the transmission. The two drive shafts 5 may, for example, come from a turbine unit having two output shafts, or may be otherwise driven by a suitable source of power. On each of the drive shafts 5, there is a spur pinion 6 driving a larger spur gear 7 constituting a tie between both shafts 5. It may also serve as a power take-off for accessory equipment, such, for example, as oil pumps, cooling pumps, etc. Near the inner end of each drive shaft 5, which is rotatably supported by two suitable bearings, one of which is shown as bearing 8, there is provided a spur-driving pinion 10 that meshes with a larger spur gear 11 which is rotatably supported by bearings 9, 12 and 13, the axis of the spur gear 11 being shown parallel to that of the drive shaft 5. The bearings 8, 12 and 13 are suitably supported by portions 14 of the housing. It will be understood that there is a corresponding gear in the opposite unshown half of the transmission.

Each of the spur gears 11 has a projecting shaft portion 16 on which there is keyed a bevel pinion 17 which meshes with two larger bevel gears 18 (Fig. 2). The two bevel gears 18 of each pair face one another, being positioned a suitable distance apart so that both can mesh with the bevel pinion 17 and are coaxial with one another, their axis being parallel to, but spaced laterally from, the axis A—A of the rotor shaft. Each of the bevel gears 18 is rotatably supported by an outer bearing 20 and an inner bearing 21, the two inner bearings being carried by a stationary supporting sleeve portion 22 that is disposed between the two bevel gears 18 and is supported by dished web portions 23 of the housing, the sleeve portion 22 and dished portion 23 being approximately concentric with the axis of the bevel gears 18.

On the back or outer side of each of the bevel gears 18, there is keyed or splined a spur pinion 25. In the embodiment illustrated, each of the bevel gears 18 and the associated spur pinion 25 are mounted on a short shaft 26 that is rotatably supported by the bearings 20 and 21. It will be understood that the bevel gear 18 and spur pinion 25 can, if desired, be made integral with one another or otherwise constructed so that they rotate together and are suitably supported for rotation. The bevel gears 18 and associated spur pinions 25 are duplicated in the opposite unshown half of the transmission.

Each of the spur pinions 25 meshes with an annular spur gear 30, there being two annular spur gears 30 disposed one above the other and mounted, respectively, on two coaxial sleeves 31 (Fig. 2) that surround, and are rotatable relative to, the inner rotor shaft 1. The annular spur gears 30 and the sleeves 31 on which they are mounted, for example by bolts 32, are thus coaxial with the rotor shafts 1 and 2. The upper spur pinion 25 and the corresponding upper spur pinion in the opposite half of the transmission (not shown) mesh with the upper annular spur gear 30 while the two lower spur pinions 25 mesh with the lower annular spur gear 30. Hence, each of the annular spur gears 30 is driven by two spur pinions 25 located diametrically opposite one another. The upper annular spur gear 30 is driven in one direction while the lower annular spur gear 30 is driven in the opposite direction.

On each of the sleeves 31, there is provided a sun gear 35 which is thus coaxial with the rotor shaft. An internal ring gear 36 surrounds, and is concentric with, each of the sun gears 35, there being an annular space between the sun gear and the associated ring gear 36. The ring gears 36 have internal teeth and are fixed in the sense that they do not rotate, being held against rotation, for example by a plurality of pins 34, but having a floating support within portions 19 of the housing 3, so that they are capable of limited movement in a radial direction. Between each of the sun gears 31 and the associated ring gear 36, there are provided a plurality of planet gears 40 meshing with the ring gear and the sun gear. In the embodiment illustrated, there are eight planet gears in each set but it will be understood that there may be more or fewer, depending on the size and the power rating of the transmission. The planetary gears 40 of each set are rotatably mounted on an annular planet carrier 41. In the construction illustrated, a plurality of tubular shafts 42—one for each planet gear 40—extend between the annular planet carrier 41 and a ring 43 that is coaxial with, and spaced from, the planet carrier 41. One end of each shaft 42 is headed as indicated at 44 and the opposite end is threaded to receive a nut 45 so as to connect the planet carrier 41 with the associated coaxial planet ring 43. A spacing sleeve 46 surrounds each tubular shaft 42 and spaces the planet carrier 41 and ring 43 a predetermined distance apart. Each of the planet gears 40 is rotatably supported on its respective shaft 42 by an anti-friction, e. g. roller, bearing 47. The spacing sleeves 46 may constitute the inner raceways of the anti-friction bearings. This construction provides a light, yet strong, planet gear carrier that can easily be assembled and disassembled.

Each of the planet carriers 41 is integral with, or fixed to, a sleeve portion 50 that is coaxial with the axis A—A of the rotor shafts and is rotatably supported, for example by bearings 51. The upper sleeve 50 is splined to the lower end of the outer rotor shaft 2 while the lower sleeve 50 is splined to the lower end of the inner rotor shaft 1. The outer rotor shaft, i. e. the shaft for the lower rotor, is thereby driven in one direction while the inner rotor shaft, i. e. the shaft of the upper rotor, is driven in the opposite direction.

An additional power take-off for accessory equipment is illustrated in Fig. 1 where a small bevel gear 55 is shown meshing with the large bevel gears 18, the bevel gear 55 being located opposite to, and coaxial with, the bevel pinion 17. Suitable gearing 56 is provided for transmitting power from the bevel gear 55 to the equipment that is to be driven, as, for example, an electric generator, rotor brakes, etc.

While certain gears have been referred to as "bevel" gears and others as "spur" gears for clarity of identification, it will be understood that the term "spur gears" is not necessarily limited to gears having parallel axes. The gears may have various tooth forms e. g. straight, helical or herring bone teeth. The term "annular" gear is herein used for the purpose of identifying the gear referred to and is not limiting as to the design of the gear. For example, the "annular" spur gears 30 may be of the hub and web or diaphragm type. The terms "keyed" and "splined" are herein used interchangeably to designate a construction having keys, splines or other interconnecting structure whereby two parts are caused to rotate together.

In the operation of the transmission described above, power may be supplied through one or both of the two parallel drive shafts 5 which rotate at high speed, for example 14,000 R. P. M., so that the torque is relatively low. The driving pinions 10 on the drive shafts 5 drive the spur gears 11 which are larger than the pinions 10 so that a speed reduction is effected with corresponding increase in torque. Each of the bevel pinions 17 which are keyed to, and hence rotate with, the spur gears 11, drives two bevel gears 18, there being four such bevel gears 18 in the transmission arranged in two pairs. As the bevel gears 18 are substantially larger than the bevel pinions 17, there is a further speed reduction with corresponding torque increase. However, the torque is now divided between the two bevel gears 18 of a pair so that excessive tooth loading of the gears is avoided. A further gear reduction is effected by the spur pinions 25—keyed respectively to the bevel gears 18—meshing with the larger annular spur gears 30. It will be noted that there are four spur pinions 25 between which the torque is divided. Moreover, as each of the annular spur gears 30 is driven by two spur pinions 25 located at diametrically opposite sides of the annular spur gear 30, the system is balanced so that bearing loads are reduced.

The final stage of the transmission comprises the two planetary gear systems for transmitting power from the sleeves 31 on which the annular spur gears 30 are mounted to the respective rotor shafts. As each of the planetary gear systems comprises a sun gear, a ring gear and a plurality of planet gears, the total torque transmitted to each rotor shaft is divided between the planet gears of each set. Thus, in the embodiment shown by way of example in the drawings, there are eight planet gears 40 in each set so that the torque is distributed between them and the load carried by any single tooth mesh is effectively reduced. In this connection, it will be understood that the floating characteristics of the "fixed" ring gear 36 assure proper division of the torque between the several planet gears. For example, if one of the planet gears is carrying more of the load than an opposite planet gear, the reaction on the gear teeth of the ring gear 36 will cause the ring gear to move a slight distance radially away from the first mentioned planet gear so that the loading on the teeth of that planet gear is reduced and the loading on the teeth of the opposite planet gear is increased so that a balancing of the load is obtained.

It will thus be seen that, in the final stage of the transmission, where the speed is relatively low and the torque to be transmitted is correspondingly high, the torque is divided among a relatively large number of driving units thus increasing the capacity of the system.

If the power unit driving one of the drive shafts 5 should fail, or be shut down, both of the rotors will still be driven by the remaining unit. Since each of the spur gears 30 is driven by two spur pinions 25, both of which derive power from either of the drive shafts 5 which are interconnected by both rotors will continue to be driven as long as power is supplied to either of the drive shafts 5. A suitable clutch and/or free wheeling unit is provided between each of the drive shafts 5 and its respective power unit so that torque may not be transmitted to either power plant from the other, thus eliminating the possibility of inter-power plant drag.

Despite its high power capacity and its high speed-reducing ratio, the transmission in accordance with the invention is relatively small, compact and light in weight and is symmetrically distributed with relation to the rotor shafts. The transmission is hence ideal for use in helicopters where space and weight are at a premium.

Figure 3:
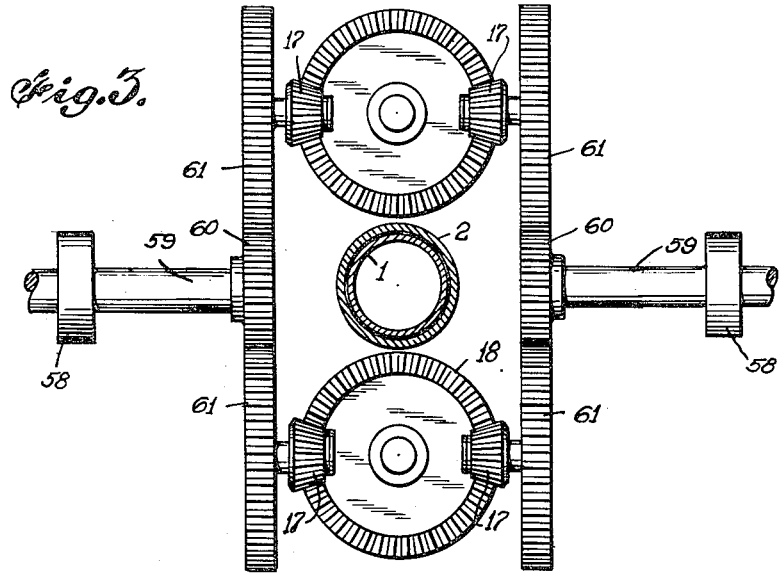
Figs. 3 to 7 are views similar to Fig. 1 but showing schematically different power input arrangements.

In Fig. 3, there is illustrated schematically an alternative arrangement in which power may be supplied through free-wheeling units 58 and two drive shafts 59 that are coaxial with one another and are located on diametrically opposite sides of the rotor shafts 1 and 2. On each of the drive shafts 59, there is a spur pinion 60 meshing with two spur gears 61, each of which is fixed to one of the bevel pinions 17 of the transmission in the basic configuration, as described above. The transmission is otherwise as described in connection with Figs. 1 and 2.

Figure 4:
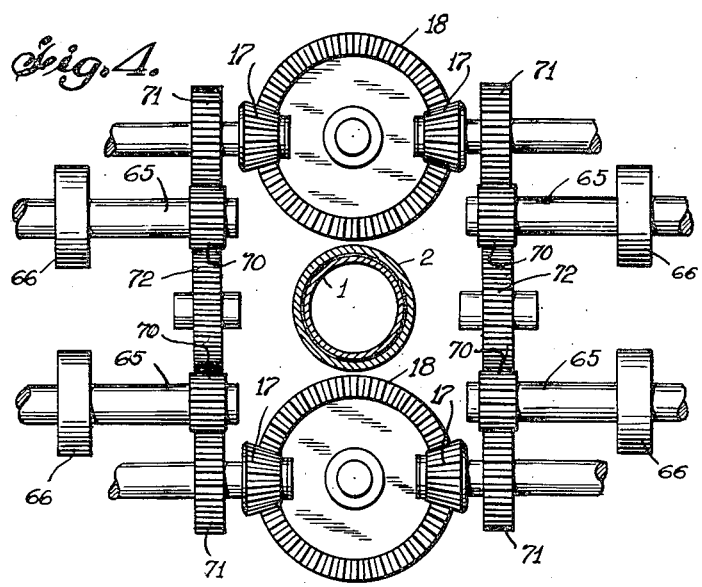

Fig. 4 shows another modification in which there are four drive shafts 65 corresponding to the two drive shafts 5 shown in Fig. 1. The transmission may, for example, be powered by two twin turbine units corresponding to the twin unit that powers the transmission illustrated in Figs. 1 and 2. Free-wheeling units 66 are provided to permit the idling or cut-out of the several turbines. On each of the drive shafts 65, there is a driving pinion 70 meshing with a spur gear 71. Each of the spur gears 71 is in turn fixed to an associated bevel pinion 17, there being thus two coaxial opposed pinions 17 meshing with each pair of bevel gears 18, the transmission being otherwise as previously described. It will be understood that, in the embodiments illustrated in Figs. 3 and 4, the second bevel pinion 17 meshing with each pair of bevel gears 18 is located in the position occupied by the bevel gear 55 of Fig. 1 which was described as being used as an accessory power take-off. Opposite pairs of the driving pinions 70 are preferably interconnected by spur gears 72 corresponding to the gear 7 of Fig. 1.

Figure 5:
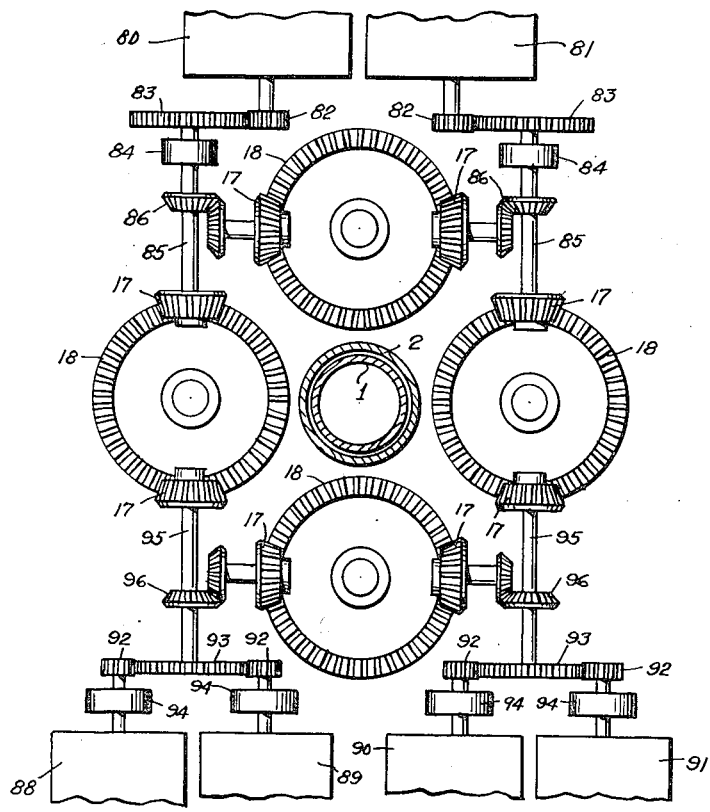

A further modification, illlustrated in Fig. 5, has four pairs of bevel gears 18 grouped around the rotor shafts 1 and 2, each pair of bevel gears being driven by a pair of bevel pinions 17. Four of the bevel pinions 17 are driven by power units 80 and 81 through spur pinions 82, meshing spur gears 83, free-wheeling units 84, shafts 85 and intermeshing bevel gears 86. The other four bevel pinions 17 are driven from power units 88, 89, 90, and 91 through free-wheeling units 94, spur pinions, 92, meshing spur gears 93, shafts 95 and intermesing bevel gears 96. The spur pinions of power units 88 and 89 are interconnected by a spur gear 93 and the spur pinions of power units 90 and 91 are similarly interconnected. It will be understood that four power units like units 88, 89, 90 and 91 may be used instead of the two power units 80 and 81. Conversely two power units like units 80 and 81 may be used instead of the four power units 88, 89, 90 and 91. The bevel gears 18 correspond to the bevel gears 18 of Fig. 1 and power is transmitted from the bevel gears to the rotor shafts in like manner. However, it will be noted that in Fig. 5 there are four pairs of the bevel gears 18 instead of the two pairs in the embodiment of Figs 1 and 2. Hence there are four spur pinions 25 meshing with each of the annular spur gears 30.

Figure 6:
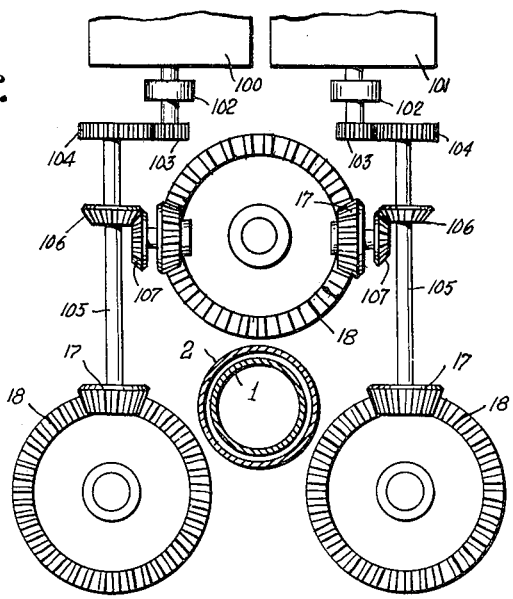
Figure 7:
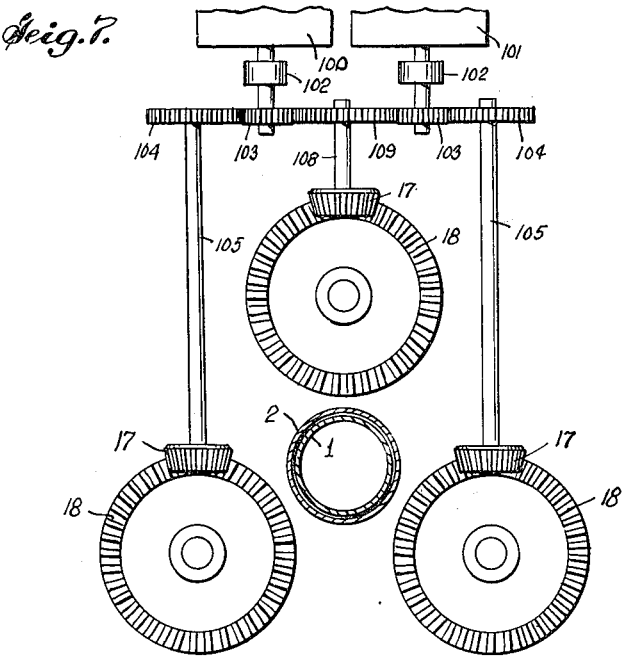

In Fig. 6 there is shown a further embodiment having three pairs of bevel gears 18 grouped around the rotor shafts 1 and 2. Two of the pairs of bevel gears 18 are driven from power units 100 and 101, through free-wheeling units 102, spur pinions 103, meshing spur gears 104, shafts 105, and bevel pinions 17. The third pair of bevel gears 18 is driven by two bevel pinions 17 connected with the two shafts 105 by intermeshing bevel gears 106 and 107. A further modification is illustrated in Fig. 7 where corresponding parts are designated by the same reference numerals as in Fig. 6 . The embodiment of Fig. 7 differs from that of Fig. 6 in that the third pair of bevel gears 18 is driven through a bevel pinion 17, shaft 108, and a spur gear 109 that meshes with and interconnects the two spur pinions 103 associated respectively with the power units 100 and 101. With the configurations shown in Figs. 6 and 7 power is transmitted from the pairs of bevel gears 18 to the outlet shafts 1 and 2 in the same manner as with that of Figs. 1 and 2. However it will be understood that there are three spur pinions driving each of the annular spur gears 30 at equally spaced points on its circumference.

While the arrangements of the power input shafts that have been described are suitable for use with power units presently available, it will be understood that this arrangement can be varied, as desired, to accommodate different numbers and arrangements of power units. It will also be understood by those skilled in the art that features of the several embodiments are mutually interchangeable and that modifications may be made in the constructional details of the transmission without departing from the invention as defined in the accompanying claims.

What I claim and desire to secure by Letters Patent is:

1. In a helicopter having coaxial rotors, two coaxial rotor shafts, two pairs of bevel gears disposed on opposite sides of said rotor shafts and rotatable about fixed axes parallel to said rotor shafts, each of said pairs comprising two coaxial bevel gears facing one another, a bevel pinion driving the two bevel gears of each pair, means connecting each of said bevel pinions with a power source, a spur pinion fixed to each of said bevel gears, two annnular spur gears coaxial with the rotor shafts, each of said annular spur gears meshing with and being driven by two of said spur pinions, namely one associated with a bevel gear of one pair and the other associated with a bevel gear of the opposite pair, a sun gear coaxial wtih and rotating with each of said annular spur gears, an internally-toothed fixed ring gear encircling each of said sun gears with an annular space between the sun gear and associated ring gear, a plurality of planet gears meshing with each of said sun gears and its associated ring gear, two carriers each rotatably supporting the planet gears associated with one of said sun gears, said carriers being coaxial with said rotor shafts and means connecting one of said carriers with one rotor shaft and the other of said carriers with the other rotor shaft.

2. In a helicopter having coaxial rotors, two coaxial rotor shafts, two pairs of bevel gears, each pair comprising two coaxial bevel gears facing and spaced from one another, said pairs of bevel gears being disposed on diametrically opposite sides of said rotor shafts and rotatable about axes parallel to the axis of the rotor shafts, a bevel pinion driving the two bevel gears of each pair, means connecting each of said bevel pinions with a power source, a spur pinion fixed to the back of each of said bevel gears, the pinions associated with one pair of bevel gears being disposed opposite the corresponding pinion associated with the other pair of bevel gears, two annular spur gears coaxial with the rotor shafts and axially spaced from one another, each of said annular spur gears meshing with and being driven by two of said spur pinions disposed opposite one another, a sun gear coaxial with and rotating with each of said annular spur gears, an internally-toothed fixed ring gear encircling each of said sun gears with an annular space between the sun gear and associated ring gear, a plurality of planet gears meshing with each of said sun gears and its associated ring gear, two carriers each rotatably supporting the planet gears associated with one of said sun gears, said carriers being coaxial with said rotor shafts and means connecting one of said carriers with one rotor shaft and the other of said carriers with the other rotor shaft.

3. In a helicopter having coaxial rotors, two coaxial rotor shafts, two pairs of bevel gears, each pair comprising two coaxial bevel gears facing and spaced from one another, said pairs of bevel gears being disposed on opposite sides of the rotor shafts and being rotatable about axes parallel to the axis of the rotor shafts, a bevel pinion driving the two bevel gears of each pair, said bevel gears being driven in opposite directions, means connecting each of said bevel pinions with a power source, a spur pinion rotatable with each of said bevel gears, two annular spur gears coaxial with the rotor shafts, each of said annular spur gears meshing with and being driven by two of said spur pinions, namely one associated with a bevel gear of one pair and the other associated with the bevel gear of the opposite pair that turns in the same direction, the two annular spur gears being thereby driven in opposite directions, a sun gear coaxial with and rotating with each of said annular spur gears, an internally-toothed ring gear encircling each of said sun gears with an annular space between the sun gear and associated ring gear, said ring gear being held against rotation and being floating to permit limited radial movement, a set of planet gears meshing with each of said sun gears and its associated ring gear, two carriers each rotatably carrying the planet gears associated with one of said sun gears, said carriers being coaxial with said rotor shafts and means connecting one of said carriers with one rotor shaft and the other of said carriers with the other rotor shaft.

4. In a helicopter having coaxial rotors, two coaxial rotor shafts, two pairs of bevel gears, each pair comprising two coaxial bevel gears facing and spaced from one another, said pairs of bevel gears being disposed on opposite sides of the rotor shafts and being rotatable about axes parallel to the axis of the rotor shafts, a bevel pinion driving the two bevel gears of each pair, means connecting each of said bevel pinions with a power source, a spur pinion rotatable with each of said bevel gears, two annular spur gears coaxial with the rotor shafts, each of said annular spur gears meshing with and being driven by two of said spur pinions, namely one associated with a bevel gear of one pair and the other associated with the bevel gear of the opposite pair, a sun gear coaxial with and rotating with each of said annular spur gears, an internally-toothed fixed ring gear encircling each of said sun gears with an annular space between the sun gear and associated ring gear, an annular planet carrier fixed to each of said rotor shafts, one of the planet carriers being adjacent each of said sun gears, a planet ring axially spaced from each of said planet carriers and fixedly joined with the respective planet carrier, a plurality of pins extending between each planet carrier and the associated planet ring and planet gears rotatably supported on said pins and engaging the adjacent sun gear and associated ring gear.

5. In a helicopter having coaxial rotors, two coaxial vertical rotor shafts, two pairs of bevel gears, each pair comprising two coaxial bevel gears facing and spaced from one another, said pairs of bevel gears being disposed on opposite sides of the rotor shafts and being rotatable about vertical axes, a bevel pinion driving the two bevel gears of each pair, means connecting each of said bevel pinions with a power source, a spur pinion fixed to each of said bevel gears, two annular spur gears coaxial with the rotor shafts, each of said annular spur gears meshing with and being driven by two of said spur pinions, namely one associated with a bevel gear of one pair and the other associated with the bevel gear of the opposite pair, a sun gear coaxial with and fixed to each of said annular spur gears, an internally-toothed fixed ring gear encircling each of said sun gears with an annular space between the sun gear and associated ring gear, an annular panet carrier fixed to each of said rotor shafts, one of the planet carriers being adjacent to and coaxial with each of said sun gears and a plurality of planet gears rotatably supported on each of the planet carriers and meshing with the adjacent sun gear and its associated ring gear.

6. In a helicopter having coaxial rotors, two coaxial vertical rotor shafts, two pairs of bevel gears rotatable about vertical axes spaced from, and on opposite sides of, the rotor shaft axis, each of said pairs comprising a lower bevel gear and a coaxial upper bevel gear facing and spaced from one another, a bevel pinion driving the two bevel gears of each pair, means connecting each of said bevel pinions with a power source, a lower spur pinion fixed to each of said lower bevel gears and an upper spur pinion fixed to each of said upper bevel gears, two annular spur gears coaxial with the rotor shafts, one of said annular spur gears meshing with the two lower spur pinions and the other of said annular spur gears meshing with the two upper spur pinions, planetary reduction gearing connecting one of said annular spur gears with one of the rotor shafts and planetary reduction gearing connecting the other of said annular spur gears with the other of the rotor shafts.

7. In a helicopter having coaxial rotors, two coaxial rotor shafts, two pairs of bevel gears, each pair comprising two coaxial bevel gears facing and spaced from one another, said pairs of bevel gears being disposed on diametrically opposite sides of said rotor shafts, and rotatable about axes parallel to the axis of the rotor shafts, a plurality of bevel pinions driving the two bevel gears of each pair, means connecting each of said bevel pinions with a power source, a spur pinion coaxial with and rotating with each of said bevel gears, two annular spur gears coaxial with the rotor shafts, each of said annular spur gears meshing with and being driven by two of said spur pinions disposed on opposite sides of the annular spur gear, namely a spur pinion associated with a bevel gear of one pair and a spur pinion associated with the corresponding bevel gear of the opposite pair, planetary reduction gearing connecting one of said annular spur gears with one of the rotor shafts and planetary reduction gearing connecting the other of said annular spur gears with the other rotor shaft.

8. In a helicopter having coaxial rotors, two coaxial rotor shafts, two pairs of bevel gears, each pair comprising two coaxial bevel gears facing and spaced from one another, said bevel gears being rotatable about axes parallel to and spaced from the axis of the rotor shafts and said pairs being disposed on diamertically opposite sides of the rotor shafts, two coaxial bevel pinions driving the two bevel gears of each pair, said pinions being diametrically opposite one another relative to the bevel gears and the axis of the bevel pinions driving one pair of bevel gears being parallel to the axis of the bevel pinions driving the other pair of bevel gears, a spur gear fixed to each of said bevel pinions, two coaxial driving gears rotatable on an axis perpendicular to the rotor shaft axis and parallel to the axes of said bevel pinions and associated spur gears, each of said driving gears meshing with a spur gear associated with one of the pairs of bevel gears and a spur gear associated with the other pair of bevel gears, a spur pinion fixed to each of said bevel gears, two annular spur gears coaxial with the rotor shafts, each of said annular spur gears meshing with and being driven by two of said spur pinions disposed on opposite sides of the annular spur gear, namely a spur pinion associated with a bevel gear of one pair and a spur pinion associated with the corresponding bevel gear of the opposite pair, planetary reduction gearing connecting one of said annular spur gears with one of the rotor shafts and planetary reduction gearing connecting the other of said annular spur gears with the other rotor shaft.

9. In a helicopter having coaxial rotors, two coaxial rotor shafts, two pairs of bevel gears, each pair comprising two coaxial bevel gears facing and spaced from one another with their axis parallel to and spaced from the axis of the rotor shafts, said pairs being disposed on diametrically opposite sides of the rotor axis, a pinion driving the two bevel gears of each pair, said bevel pinions being rotatable on parallel axes, a spur gear fixed to each of said bevel pinions, two parallel driving shafts parallel to and offset from the axes of said bevel pinions, a driving gear on each of said driving shafts meshing respectively with one of said spur gears, a spur pinion fixed to each of said bevel gears, two annular spur gears coaxial with the rotor shafts and rotatable relative thereto, each of said annular spur gears meshing with and being driven by two of said spur pinions disposed on opposite sides of the annular spur gear, namely a spur pinion associated with a bevel gear of one pair and a spur pinion associated with the corresponding bevel gear of the opposite pair, planetary reduction gearing connecting one of said annular spur gears with one of the rotor shafts and planetary reduction gearing connecting the other of said annular spur gears with the other rotor shaft.

10. In a transmission for driving two coaxial outlet shafts, a plurality of pairs of bevel gears grouped around said outlet shafts and rotatable about fixed axes approximately parallel to said outlet shafts, each of said pairs comprising two coaxial bevel gears facing one another, a bevel pinion driving the two bevel gears of each pair, means connecting each of said bevel pinions with a power source, a spur pinion fixed to each of said bevel gears, two annular spur gears coaxial with and rotatable relative to said outlet shafts, the spur pinion fixed to one of the bevel gears of each of said pairs meshing with and driving one of said annular spur gears and the spur pinion fixed to the other bevel gear of each of said pairs meshing with and driving the other of said annular spur gears, plantary reduction gearing connecting one of said annular spur gears with one of said outlet shafts and planetary reduction gearing connecting the other of said annular spur gears with the other of said outlet shafts.

11. In a helicopter having coaxial rotors, two coaxial rotor shafts, a plurality of pairs of bevel gears uniformly disposed around said rotor shafts, each of said pairs comprising two coaxial bevel gears facing one another, a bevel pinion driving the two bevel gears of each pair, means connecting each of said bevel pinions to a power source, a spur pinion fixed to each of said bevel gears, two annular spur gears coaxial with the rotor shafts, one of said annular spur gears meshing with and being driven by the spur pinions associated with one bevel gear of each of said pairs and the other of said annular spur gears meshing with and being driven by the spur pinions associated with the other bevel gear of each of said pairs, a sun gear coaxial with and rotating with each of said annular spur gears, an internally-toothed fixed ring gear encircling each of said sun gears with an annular space between the sun gear and associated ring gear, a plurality of panel gears meshing with each of said sun gears and its associated ring gear, two carriers each rotatably supporting the planet gears associated with one of said sun gears, said carriers being coaxial with said rotor shafts and means connecting one of said carriers with one rotor shaft and the other of said carriers with the other rotor shaft.

References Cited in the file of this patent

UNITED STATES PATENTS

| 168,955 | Annin | Oct. 19, 1875 |
| 2,305,454 | Nallinger et al. | Dec. 15, 1942 |
| 2,525,190 | Toot et al. | Oct. 10, 1950 |
| 2,534,168 | Greenwood | Dec. 12, 1950 |

FOREIGN PATENTS

| 930,702 | France | Feb. 3, 1948 |